Nov. 11, 1952   E. A. RUTH   2,617,270
TRUCK FOR DELIVERY OF REFRIGERATED PACKAGED GOODS
Filed May 4, 1950   2 SHEETS—SHEET 1
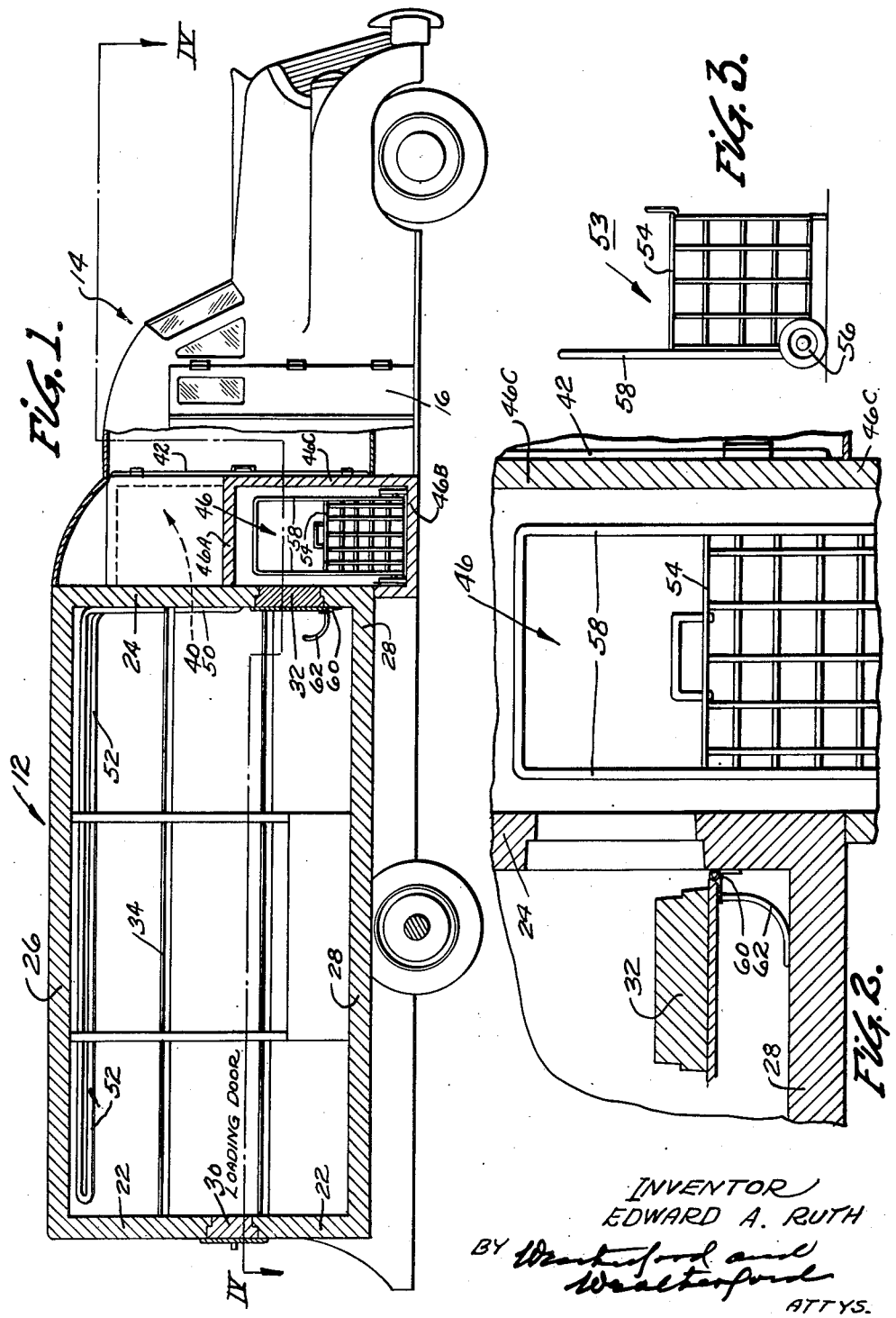
INVENTOR
EDWARD A. RUTH
BY Weatherford and Weatherford
ATTYS.

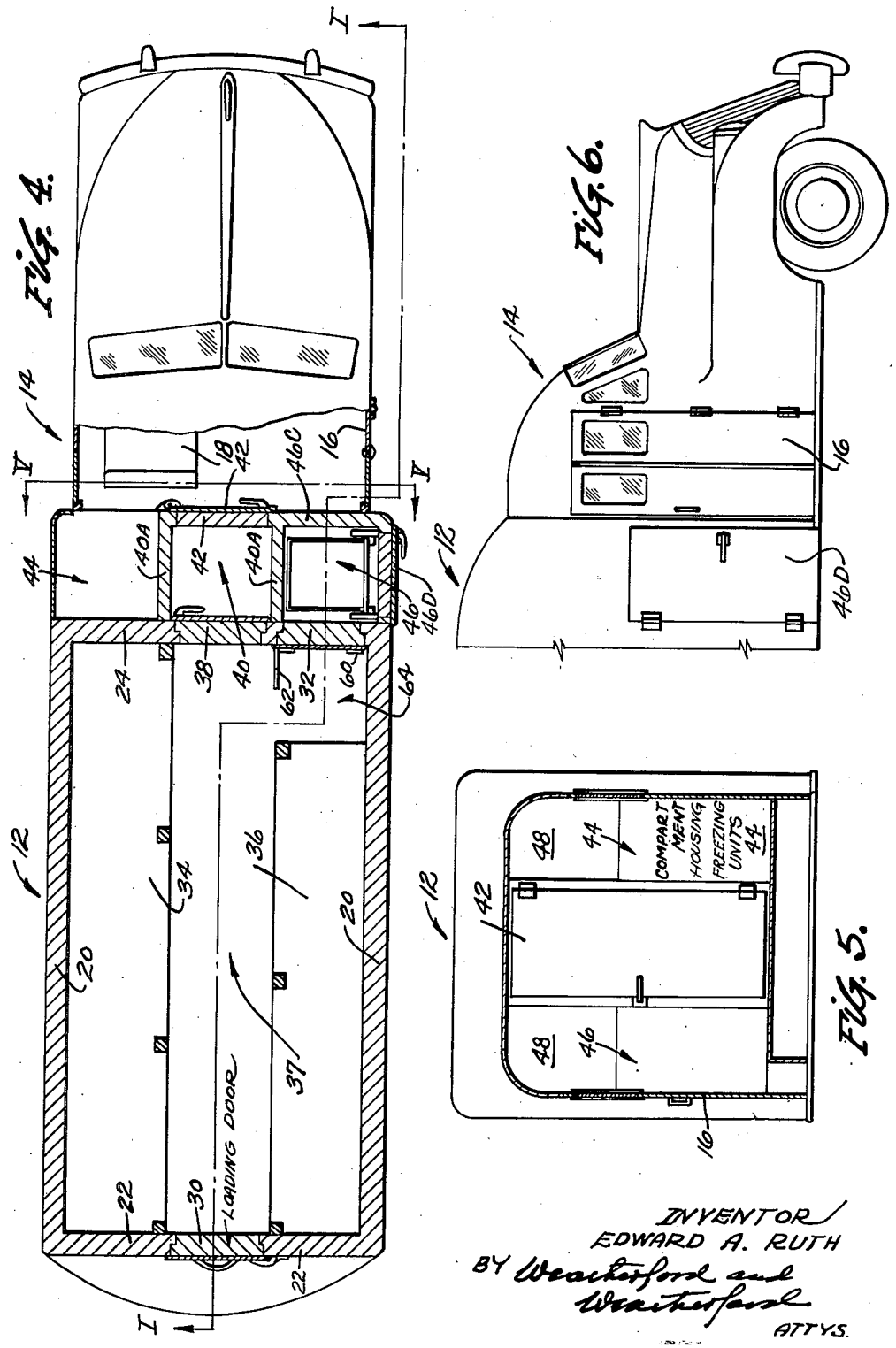

Patented Nov. 11, 1952

2,617,270

UNITED STATES PATENT OFFICE 2,617,270

TRUCK FOR DELIVERY OF REFRIGERATED PACKAGED GOODS

Edward A. Ruth, Memphis, Tenn., assignor of twenty per cent to Heiskell Weatherford, Jr., Memphis, Tenn.

Application May 4, 1950, Serial No. 159,890

7 Claims. (Cl. 62—117)

This invention relates to trucks for transporting frozen or other refrigerated goods, particularly goods which are in packages, from a storage warehouse or wholesale store to individual stores, and to means for facilitating the removal of the goods from the truck for delivery with a minimum loss of time, and a minimum escape of cold air from the truck body during such removal.

Frozen goods at the present time are usually delivered in motor trucks having insulated walls, roof and floor, and which are provided with refrigerating mechanism and coils through which a refrigerant is circulated to keep the interior of the body at or below freezing. Such bodies are provided with a door or doors through which loading and unloading is accomplished. Each delivery requires opening of the door to enter and select the goods and opening of the door to remove the selected goods, the packages for one delivery point often requiring two or more trips into the body, each requiring that the door be opened twice. Each opening of a door allows substantial loss of cold air to escape and where numerous deliveries are made often sets up serious refrigerating problems or even may result in loss of goods from under refrigeration. To the loss of refrigeration must be added the loss of time consumed by the truck driver in leaving his truck in the usual manner from the more convenient left side of the vehicle with its incidental danger in heavy traffic, and the distances necessarily covered to reach and enter through an opposite side door or the more usual rear door.

The objects of the invention are:

To provide means for minimizing loss of cold air from the truck body;

To provide means for reducing the distances to be covered by the driver in reaching the goods to be assembled, and in assembling the goods for delivery;

To provide means for minimizing number of entrances into and exits from, the truck body;

To provide means for minimizing the loss of cold air from the truck body in entering the body to assemble the goods, in leaving the body, and in removing the assembled goods;

To provide means for removing a number of packages at one time with minimum loss of cold air, and to facilitate the delivery of the removed packages.

The means by which the foregoing and other objects of this invention are accomplished and the manner of their accomplishment will readily be understood from the following specification upon reference to the accompanying drawings, in which, Fig. 1 is a sectional elevational view of the truck taken on the stepped line I—I of Fig. 4.

Fig. 2 is an enlarged view taken on a portion of the same line showing the loading door to the package assembly compartment open.

Fig. 3 is a side elevation of the package carrier removed from the compartment.

Fig. 4 is a sectional plan view of the truck taken on the stepped line IV—IV of Fig. 1.

Fig. 5 is a transverse sectional elevational view taken on the line V—V of Fig. 4; and Fig. 6 is a side elevational view showing entrance door to the truck cab and package removal door from the package assembly compartment.

Referring now to the drawings in which the various parts are indicated by numerals, the truck includes a body section 12 and cab section 14.

The cab section 14 has a door 16 on the right hand side of the truck, and may have a driver's seat 18.

The body section includes side walls 20, rear and front walls 22, 24 and roof and floor walls 26, 28, all well insulated against transfer of heat. The rear wall 22 is provided with a door 30, which is openable for the introduction and loading of packaged goods (not shown) into the body, and the forward wall 24 with a door 32 through which the packages are shifted for delivery. Shelves 34, 36 are preferably provided on opposite sides of the body for storage of packages within the body, the shelves on the two sides being separated by an aisle 37 extending longitudinally from end to end of the body section.

At its front end the body is provided with an entrance door 38 which opens from the body section 12 into an ante-chamber 40, having walls 40A, preferably well insulated, though not necessarily so heavily insulated as the body and having a second door 42 opening into the cab 14.

Flanking the ante-chamber 40 is a compartment 44 housing suitable freezing units, not shown, and a package assembly compartment 46 into which goods or packages are shifted from the body section 12 for delivery to the customer. Preferably these compartments are of less height than the interior of the cab and the spaces 48 thereabove are left forwardly open into the cab and serve as storage spaces for non refrigerated articles, containers, literature or other things, none of which are shown.

From the freezing unit compartment, pipes 50 (Fig. 1) lead to a refrigeration coil or coils 52 advantageously located for the cooling or refrigeration of the body.

The walls of the package assembly compartment include a top wall 46A, a floor 46B, the end wall 24 of the body section, one of the walls 40A of the ante-chamber, a forward wall 46C opposite the body end wall 24 and a package removal door 46D substantially forming the other wall and opening outward through the right side of the cab section in adjacency to the door 16 for removal of the packages shifted through the delivery door 32 from the body section. A hand truck 53 which may include an open top basket 54 which is of height to extend substantially to the level of the bottom of the package door 32, wheels 56 and handles 58, and which preferably snugly fits the assembly compartment, is placed in the compartment to receive the packages, and after loading is removed and used to transfer the packages to the customer. The door 32 is hinged along its lower edge to the wall 24 by spring hinges 60 which hold the door closed, the door preferably having a projecting arm 62 which may be engaged by the operator's foot to open and hold open the door during loading the basket. The shelves 36 along the right hand side of the body are cut away at the forward end of the body to leave a transverse passageway 64 connecting to the longitudinal passageway 37 and affording access to the door 32.

In use the packages are placed in the body section at the shipping point, usually being handed in through the rear door 30 to the truck driver who places them on the shelves.

When the customer's place of business is reached the truck is parked against the curb if possible, the driver enters the truck body through the ante-chamber doors 42 and 38 and brings the packages to the front of the body, where he depresses the arm 62 with his foot and holds the door 32 open while placing the packages through the door opening in the basket 54, placing only such packages as make up the instant delivery, and obviously if possible including all the packages which make up the delivery. During assembly of the shipment the assembly compartment is closed against escape of cold air. After assembly is made the door 32 is closed, the driver leaves the body section through the antechamber, goes through the cab door to the assembly compartment door, removes the hand truck and makes delivery to the customer and after said delivery replaces the hand truck in the assembly compartment ready for the next assembly of packages.

In entering and leaving the body only one of the ante-chamber doors is opened at a time and only a limited amount of cold air escapes from the freezing chamber, and similarly the assembly compartment acts as an ante-chamber in placing and removing the packages.

It will be understood that insulation and other features which are well known in their respective arts are indicated only, rather than shown in specific detail and that only such details as are specifically included in any claim shall be considered therein.

It will also be understood that the location of the ante-chamber and assembly compartment, and the location of access doors to the chamber and compartment shown are the locations preferred, but that such preference shall not be binding unless specifically recited in a claim.

It will especially be noted that the assembly compartment is not necessarily adjacent or in the forward part of the body, or on the right hand side of the body but may be otherwise located if so desired, and that the entrance door to the body and the ante-chamber, if used, may be otherwise located than in the forward end of the body as where the cab and body are pivotally or detachably coupled in the well known tractor trailer types of trucks and bodies, and particular attention is called to the omission of such locations and/or parts in some of the claims.

I claim:

1. A truck body for transportation of refrigerated packages, which body includes a storage section and refrigerating means therefor, and a compartment for assembly for delivery of packages from said body, said storage section and said compartment having completely enclosing insulated walls and said storage section having an access door; one wall of said compartment being an exterior wall, and including an access door, and another wall thereof separating said compartment from said storage section, said separating wall being provided with a door opening spaced above the floor of said storage section; a closure door for said opening, means hinging said door to said wall along the lower edge of said opening to open outwardly and downwardly into said storage chamber, means which may be a part of said hinge means urging closure of said door, and means for holding and supporting said door when open in substantially horizontal position.

2. A truck body for transportation of refrigerated packages, which body includes a cab having a side entrance door, a storage section and refrigerating means therefor, and relatively small compartments interposed between said cab and said storage sections, said compartments respectively forming, a housing for said refrigerating means, an antechamber and a compartment for assembly of packages from said storage section for delivery; said antechamber having doors respectively communicating with said cab and with said storage section; said storage section, said antechamber and said assembly compartment having completely enclosing insulating walls, said assembly compartment being at one side of said body and one of its walls being an exterior wall accessible from outside said body, and another wall forming part of one said storage section wall and separating said compartment from said storage section; said assembly compartment having an access door substantially coextensive with its width and height through said exterior wall, and there being a package transfer door through said separating wall spaced above the floor of said storage section and communicating said storage section into the upper portion of said assembly compartment, said cab door being on the same side of said body as said compartment and adjacent said access door thereinto.

3. A truck body for transportation of refrigerated packages, which body includes a cab having a side entrance door, a storage section and refrigerating means therefor, and relatively small compartments interposed between said cab and storage sections, one of said compartments forming, an antechamber and another thereof a compartment for assembly of packages from said storage section for delivery; said antechamber having doors respectively communicating with said cab and with said storage section; said storage section, said antechamber and said assembly compartment having completely enclosing insulating walls, said assembly compartment being at one side of said body and its said walls including an exterior wall accessible from outside said body, a wall forming part of said storage section walls and separating said compartment from said storage section and a floor stepped downward substantially below the floor of said storage section; said assembly compartment having through said exterior wall an access door, and there being a package transfer door through said separating wall, spaced above the floor of said storage section and communicating said storage section into the upper portion of said assembly compartment, said cab door being on the same side of said body as said compartment and adjacent said access door thereinto.

4. A truck body for transportation of refrigerated packages, which body includes a cab having a side entrance door, a storage section and refrigerating means therefor, and a relatively small assembly compartment interposed between said cab and storage sections, door means communicating said cab and said storage section independent of said assembly compartment; said storage section, and said assembly compartment having completely enclosing insulating walls, said assembly compartment being at one side of said body and its said walls including an exterior wall accessible from outside said body, and another wall forming part of one of said storage section walls and separating said compartment from said storage section; said assembly compartment having an access door through said exterior wall and there being a package transfer door through said separating wall spaced above the floor of said storage section and communicating said storage section into the upper portion of said assembly compartment.

5. A truck body for transportation of refrigerated packages, which body includes a storage section, an antechamber, and a compartment for assembly of packages from said storage section for delivery, said antechamber and said compartment being adjacent and disposed at one end of said storage section, with said compartment at one side of said body; said storage section having an access door leading from said antechamber; said storage section, said antechamber and said assembly compartment having completely enclosing insulating walls; said assembly compartment walls including an exterior wall accessible from outside said body, and wall means forming part of said storage section walls and separating said compartment from said storage section, said assembly compartment having through said exterior wall an access door, and there being a package transfer door through a portion of said separating wall means, communicating said storage section into said assembly compartment.

6. A truck body in accordance with claim 5, in which said package transfer door is hinged to a vertically disposed portion of said wall means.

7. A truck body for transportation of refrigerated packages, which body includes a cab having an entrance door, a storage section, an antechamber and a compartment for assembly of packages from said storage section for delivery interposed between said cab and said storage section with said compartment at one side of said body; said antechamber having doors respectively communicating with said cab and with said storage section; said storage section, said antechamber and said assembly compartment having completely enclosing top, bottom, and side insulating walls; said assembly compartment including an exterior wall accessible from outside said body, and wall means separating said compartment from said storage section; said assembly compartment having an access door substantially co-extensive with its width and height through said exterior wall, and there being a package transfer door through said separating wall means communicating said storage section into said assembly compartment.

EDWARD A. RUTH.

REFERENCES CITED

The following references are of record in the file of this patent:

UNITED STATES PATENTS

| Number | Name | Date |
|---|---|---|
| 1,620,494 | Schnabel | Mar. 8, 1927 |
| 1,874,364 | Sartain | Aug. 30, 1932 |
| 1,890,257 | Hafner et al. | Dec. 6, 1932 |
| 1,907,217 | Rott | May 2, 1933 |
| 2,125,205 | Snowden | July 26, 1938 |
| 2,464,923 | Davis | Mar. 22, 1949 |
| 2,484,572 | Jude | Oct. 11, 1949 |